(12) United States Patent
Massbaum et al.

(10) Patent No.: US 11,370,149 B2
(45) Date of Patent: Jun. 28, 2022

(54) METHOD FOR PRODUCING A NEGATIVE SKIN, AND TOOL

(71) Applicant: FRIMO GROUP GMBH, Lotte (DE)

(72) Inventors: Oliver Massbaum, Lotte (DE); Hermann Huster, Lotte (DE)

(73) Assignee: Frimo Group GmbH, Lotte (DE)

( * ) Notice: Subject to any disclaimer, the term of this patent is extended or adjusted under 35 U.S.C. 154(b) by 1 day.

(21) Appl. No.: 16/631,623

(22) PCT Filed: Jul. 17, 2018

(86) PCT No.: PCT/EP2018/069377
§ 371 (c)(1),
(2) Date: Jan. 16, 2020

(87) PCT Pub. No.: WO2019/016202
PCT Pub. Date: Jan. 24, 2019

(65) Prior Publication Data
US 2020/0171712 A1    Jun. 4, 2020

(30) Foreign Application Priority Data

Jul. 18, 2017  (DE) .................. 10 2017 212 240.4

(51) Int. Cl.
*B29C 33/38*  (2006.01)
*B29C 33/42*  (2006.01)
(Continued)

(52) U.S. Cl.
CPC ...... *B29C 33/3857* (2013.01); *B29C 33/3878* (2013.01); *B29C 33/424* (2013.01); *B29C 33/44* (2013.01); *B29C 33/52* (2013.01); *B29C 39/006* (2013.01); *B29C 39/34* (2013.01); *B29C 33/565* (2013.01); *B29C 45/4457* (2013.01); *B29C 67/241* (2013.01); *B29K 2083/005* (2013.01); *B29L 2031/3005* (2013.01)

(58) Field of Classification Search
CPC ..... B29C 33/52; B29C 39/34; B29C 45/4457; B29C 67/241
See application file for complete search history.

(56) References Cited

U.S. PATENT DOCUMENTS 5,013,508 A * 5/1991 Troester ............... B29C 41/08
264/224
6,491,855 B1 * 12/2002 Harper ............... B29C 33/3878
264/219
(Continued)

FOREIGN PATENT DOCUMENTS

DE     39 13 157 A1    1/1990
DE    101 02 600 A1    8/2002
(Continued)

OTHER PUBLICATIONS

Search Report for German Application No. 10 2017 212 240.4, dated May 4, 2018.
(Continued)

*Primary Examiner* — Benjamin A Schiffman
(74) *Attorney, Agent, or Firm* — Wolf, Greenfield & Sacks, P.C.

(57) ABSTRACT

The present invention relates to a method for producing a negative skin and a tool. Such a tool can be used, for example, in the automotive industry.

11 Claims, 3 Drawing Sheets

(51) Int. Cl.

| | | |
|---|---|---|
| *B29C 33/44* | (2006.01) | |
| *B29C 39/00* | (2006.01) | |
| *B29C 33/52* | (2006.01) | |
| *B29C 39/34* | (2006.01) | |
| *B29C 33/56* | (2006.01) | |
| *B29K 83/00* | (2006.01) | |
| *B29L 31/30* | (2006.01) | |
| *B29C 45/44* | (2006.01) | |
| *B29C 67/24* | (2006.01) | |

(56) References Cited

U.S. PATENT DOCUMENTS

| | | | | |
|---|---|---|---|---|
| 6,730,247 B2* | 5/2004 | De Winter | ............ | B29C 67/246 |
| | | | | 264/45.5 |
| 6,998,085 B2* | 2/2006 | De Winter | .............. | B29C 33/68 |
| | | | | 264/255 |

FOREIGN PATENT DOCUMENTS

| | | | |
|---|---|---|---|
| DE | 101 36 391 A1 | 2/2003 | |
| DE | 10 2013 222 011 A1 | 4/2015 | |
| EP | 1 177 880 A1 | 2/2002 | |
| EP | 3 170 641 A1 | 5/2017 | |
| GB | 2319205 A * | 5/1998 | ......... B29C 33/3857 |

OTHER PUBLICATIONS

International Search Report and Written Opinion for International Application No. PCT/EP2018/069377, dated Sep. 21, 2018.

* cited by examiner

METHOD FOR PRODUCING A NEGATIVE SKIN, AND TOOL

CROSS-REFERENCE TO RELATED APPLICATIONS

This application is a national stage filing under 35 U.S.C. § 371 of international application no. PCT/EP2018/069377, filed Jul. 17, 2018, which claims priority to German application no. 10 2017 212 240.4, filed Jul. 18, 2017, each of which is herein incorporated by reference in its entirety.

TECHNICAL FIELD

The present invention relates to a method for producing a negative skin. The method can, for example, be used in the automotive industry. The invention further relates to a tool having such a negative skin.

Such a device and method can be used, for example, when producing negative skins made of silicone, wherein the negative skins are used in a following method for producing surfaces such as, for example, skins produced by coating application or PU skins. As a simple example, such skins provide the visible side of dashboards, door panels, seats, headrests, steering wheels or the like.

PRIOR ART

The production of silicone skins is a common method. Silicone skins are used in a tool as a negative in order to produce surfaces by coating application or cast skins made of polyurethane or a similar material. Silicone skins are also referred to as negative skins.

The casting of silicone between two form halves constitutes one step for the production of such a silicone skin. For example, DE 101 36 391 A1 shows a method for producing grained cast skins made of polyurethane for vehicle interior panels, in which method a negative skin made of silicone is used.

In addition to high-quality processing, the focus in this context is, inter alio, also on the issue regarding the complexity of the tools and thus the associated costs. Due to undercuts in the geometries to be molded, the individual mold halves used must be configured in multiple parts in the prior art in order to allow the negative skins to be removed after molding, or to be able to open the mold.

In the prior art, the use of, for example, loose parts such as sliders or flaps in such molds is also provided. However, these parts can result in a poorer overall visual impression, especially if these flaps are provided on visible surfaces of the cast skins to be produced. Moreover, there is a massive increase in the complexity of the mold halves. The latter is detrimental to the costs for such a tool.

SUBJECT MATTER OF THE INVENTION

Starting from the prior art, it is an object of the present invention to reduce or entirely remove the problems known in the prior art, and to be able to provide a simplified method for producing a negative skin.

The subject matter of claim 1 provides a method with which the aforementioned objectives can be achieved. Further preferred embodiments are stated in the dependent claims. The present invention moreover relates to a tool according to claim 9. Certain individual features of the subclaims of the method can also be used for the tool and vice versa.

Claim 1 specifically provides a method for producing a negative skin, in particular a negative skin for producing a skin by application of a coating, wherein the method comprises the following steps.

First of all, a positive body is provided, preferably having a grain which in particular is an etched grain, a galvanically produced grain or a laser grain, wherein a first surface of the positive body forms a positive mold of a negative skin to be produced, and wherein the first surface has at least one undercut. A wax layer is then applied on the first surface of the positive body, and the at least one undercut is filled with the wax layer. Finally, a tool cavity is placed on the wax layer, and the tool cavity is coated on the applied wax layer using an applied layer.

Thus, this method makes it possible to use a one-part or multi-part tool cavity which, together with the previously applied coating, can be used as one of the mold halves. The reason for this is that, compared to the tool cavities in the prior art, the tool cavity does not have any undercuts, or rather a reduced number thereof, by which removal of the tool cavity from the base body is easily possible in one direction. The produced negative skin therefore has thickenings in places where the base body has undercuts.

The present invention is, inter alia, based on the finding that the tool cavity could be configured less complex.

Based on this finding, the invention provides a tool as well as a production method with which a negative skin can be produced in a way that undercuts on the tool cavity are avoided by means of thickenings.

Preferably, base body and tool cavity can be tempered. Thus, during a casting process, a negative skin can be kept at a constant temperature or a preferred cooling gradient can be strictly observed.

The method for producing a negative skin preferably has, in areas where no undercuts are filled in, a wax layer with a thickness of 1 mm to 2 mm, more preferably about 1.5 mm. This is a preferred thickness of the later negative skin in different applications.

In the disclosed method, the layer of the tool cavity can, as compared to the applied wax layer, have a thickness of 5 mm to 15 mm, preferably 5 mm to 12 mm, more preferably about 9 mm. This value has turned out to be particularly suitable for the casting and can be taken into account in the construction.

A tool can be produced by means of the above-disclosed method. This tool has a base body forming a negative mold for a surface of a negative skin of the cast skin to be produced. Moreover, the tool has a tool cavity that is coated and is free of undercuts, wherein the layer images the other surface of the negative skin.

This tool according to the invention is able to produce skins with undercuts, without having a tool cavity with undercuts. The tool cavity can thus be configured in one part, which results in a reduced complexity and thus a reduction of costs.

Moreover, tool cavity and base body can be tempered so as to ensure a required temperature gradient, for example for a cooling process of the produced skin, or to allow a constant reaction temperature.

In particular, the base body of the tool has undercuts. A skin to be produced therefore can have arbitrary complex geometries on one of its surfaces and is not restricted to a geometry without undercuts. Preferably, the surface of the skin to be formed on the base body is later a visible surface.

More preferably, the tool is able to produce a skin with a substantially constant thickness, except for the areas where the base body images the undercuts. A particularly valuable feel of the skin can thus be achieved, and material can additionally be reduced.

A further embodiment of the present disclosure is a negative skin produced by the aforementioned method.

DETAILED DESCRIPTION OF THE PREFERRED EMBODIMENTS

A preferred embodiment of the present invention is described below by the enclosed figures. Further modifications of certain individual features mentioned in this context can each be combined with one another in order to form new embodiments.

The present embodiment relates to a method for producing a negative skin. Negative skins 16 can be produced by such a method. In the context of the following description, the term negative skin refers to the thus produced intermediate product which, as shown above, can be used in a subsequent method, for example for producing surfaces by coating application as part of a foaming method or for producing, for example, PU skins.

Such negative skins 16 can have variable thicknesses, curvatures and dimensions and are used, for example, in the automotive industry, for example in the production of dashboards. Further examples are door panels, glove box covers, steering wheels or the like. To create an improved haptic feel, a PU skin produced with this negative skin 16 can be coated and foamed before mounting. However, the negative skins produced within the scope of the present invention are primarily used—by application of a coating on the negative skin and subsequent foaming—to obtain a component having a corresponding coated surface.

Negative skins 16 are preferably made of silicone compounds. However, the following embodiment is not limited to this.

Figure 1:
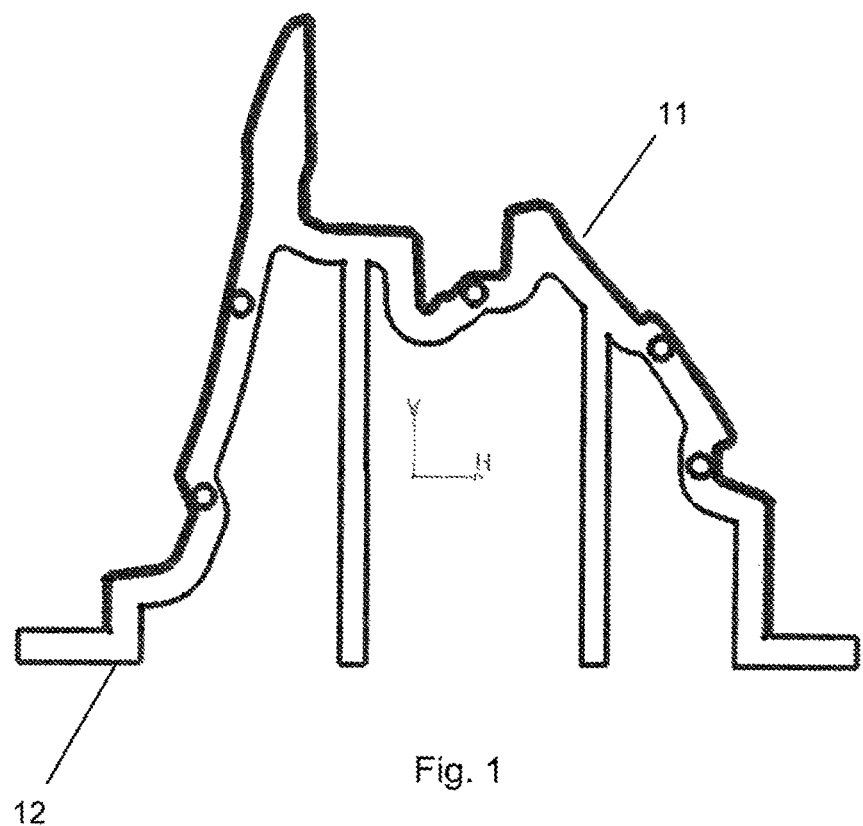
FIG. 1 shows a schematic cross-sectional view of a first method step according to the present embodiment.

FIG. 1 shows a schematic cross-section of a first method step according to the present embodiment. A Galvanoform mold 11 forms a positive body having a surface corresponding to a positive surface of a skin to be produced in a further method. The positive surface of the Galvanoform mold 11 has textures which should also characterize the later negative skin 16, for example a leather grain or structures for a better haptic experience, impregnated trade names or safety instructions. In the present embodiment, the Galvanoform mold 11 has a thickness in the range of 3 mm to 5 mm, preferably about 4 mm.

This Galvanoform mold 11 is mounted on a solid base body 12, wherein the positive surface of the Galvanoform mold points away from the base body. The base body 12 can be tempered. This can be realized by liquid cooling through the base body 12 or by single heating or cooling elements being provided at different points of the base body 12. Preferably, the temperature of the base body 12 can be controlled so as to precisely achieve a desired cooling curve of a used material for the negative skin 16. More preferably, this control can also be configured in an adaptive manner so as to better adjust to high temperature gradients. The tempering of the base body 12 and the temperature control thereof is not shown in FIGS. 1 to 5.

In the first method step of the preferred embodiment, the Galvanoform mold 11 is mounted on the base body 12.

Figure 2:
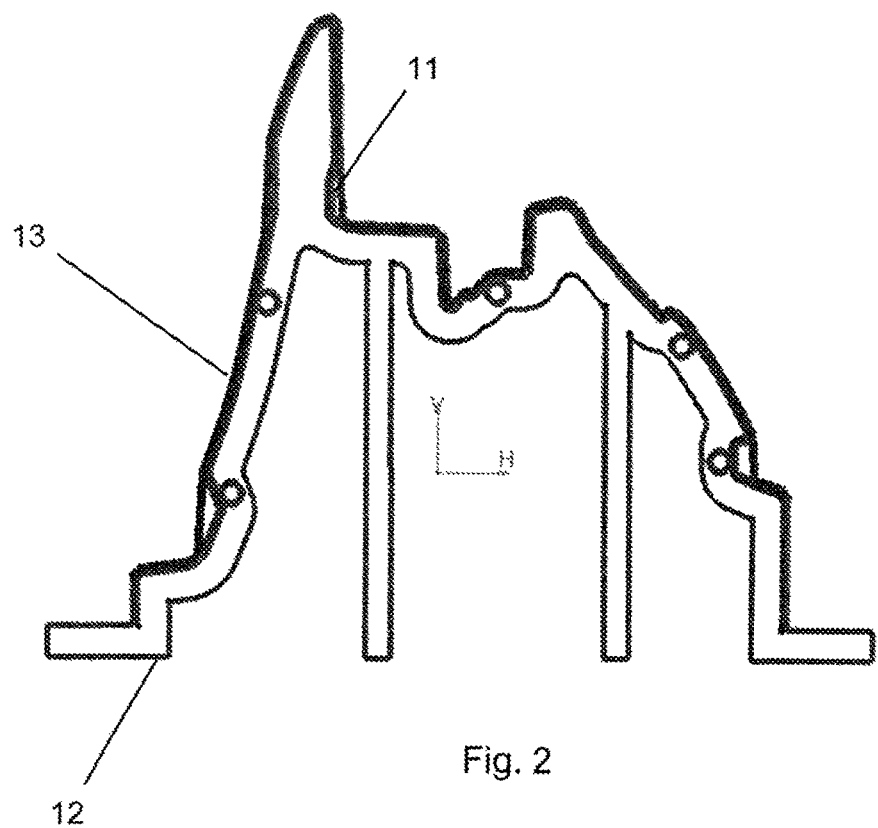
FIG. 2 shows a schematic cross-sectional view of a second method step according to the present embodiment.

FIG. 2 shows a next subsequent step. Here, a wax layer 13 is applied on the Galvanoform mold 11. The thickness of the wax layer 13 essentially corresponds to the thickness of the later negative skin 16. This thickness can preferably be in a range of between 1 mm and 2 mm, for instance about 1.5 mm, which has proven to be a good value for negative skins 16 of silicone in the automobile industry. Other applications or used materials can require other thicknesses.

In addition, the provided undercuts are also filled in this wax application step. This can be done after an even wax layer 13 was applied as described above or at the same time thereas. The wax layer 13 thus obtained essentially has the same geometry as a negative skin 16 to be later produced by the tool.

Figure 3:
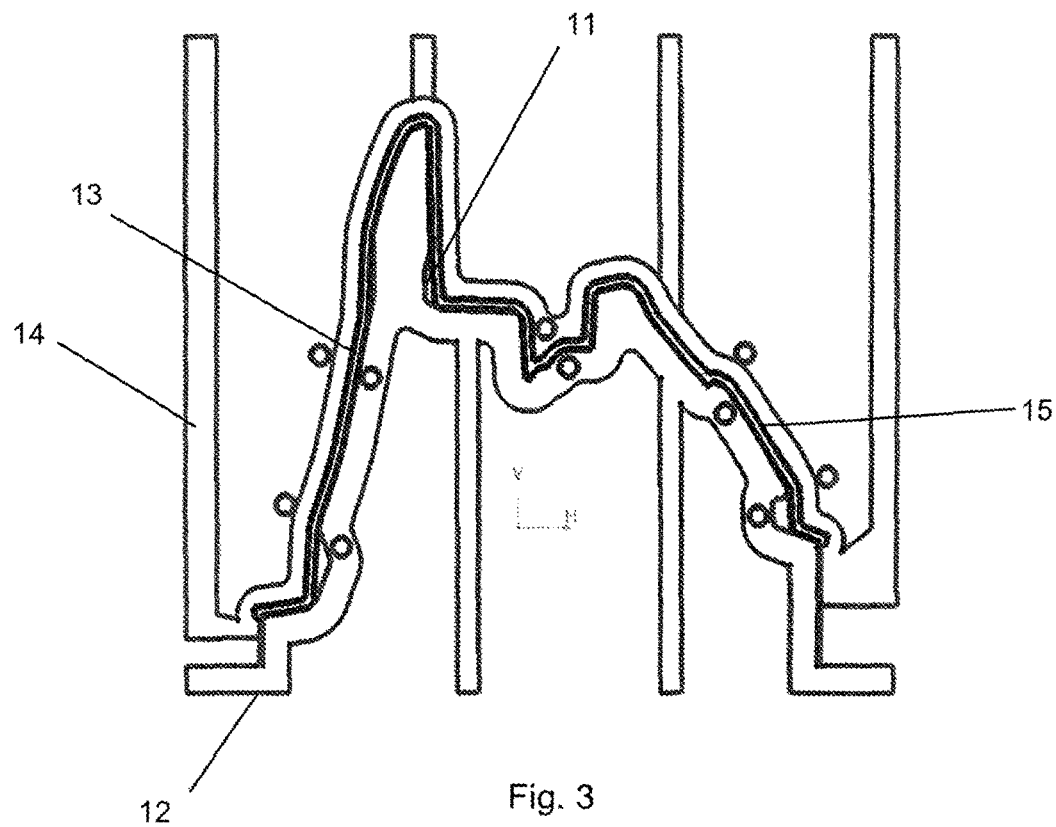
FIG. 3 shows a schematic cross-sectional view of a third method step according to the present embodiment.

FIG. 3 shows a following step. Firstly, a tool cavity 14 is moved towards the previously created combination of Galvanoform mold 11, base body 12 and wax layer 13. The tool cavity 4 does not have any undercuts.

Preferably, the tool cavity 14 can, just as the base body 12, be tempered and, more preferably, the temperature thereof can be controlled.

After the tool cavity 14 is moved, there is a gap between a surface of the tool cavity 14, which is opposite the negative surface of the base body 12, and the surface of the previously produced wax surface. This gap is coated in this third method step using a layer 15.

This layer 15, which is restricted by the two surfaces defined above, preferably has a thickness of about 9 mm. Irregularities of the geometry of the tool cavity can be corrected by changing the thickness of the layer 15. However, it is preferred that the thickness of the layer 15 does not vary too much so as to avoid an uneven temperature gradient.

Thus, a surface of the layer 15 is connected to the one surface of the wax layer 13. Since, as described above, this one surface of the wax layer 13 is a positive surface of the negative skin 16 to be produced, the surface of the layer 15 is thus a negative surface thereof.

The tool for producing a negative skin 16 produced according to these steps thus geometrically defines the negative skin 16 by a surface of the Galvanoform mold 11 and a surface of the layer 15 of the tool cavity 14.

Before using the tool, its wax layer of the Galvanoform mold 11 can still be removed.

Figure 4:
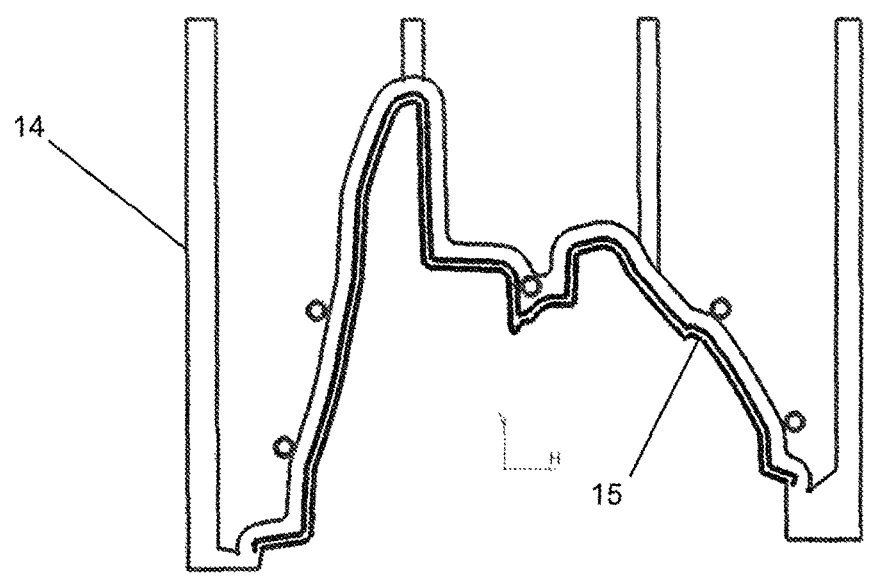
FIG. 4 shows a further process with the used tool cavity.

FIG. 4 shows a resulting tool cavity 14 with applied layer 15. Since it is free of undercuts, this tool cavity 14 can be used in further processes as a supporting mold for the negative skin 16.

Figure 5:
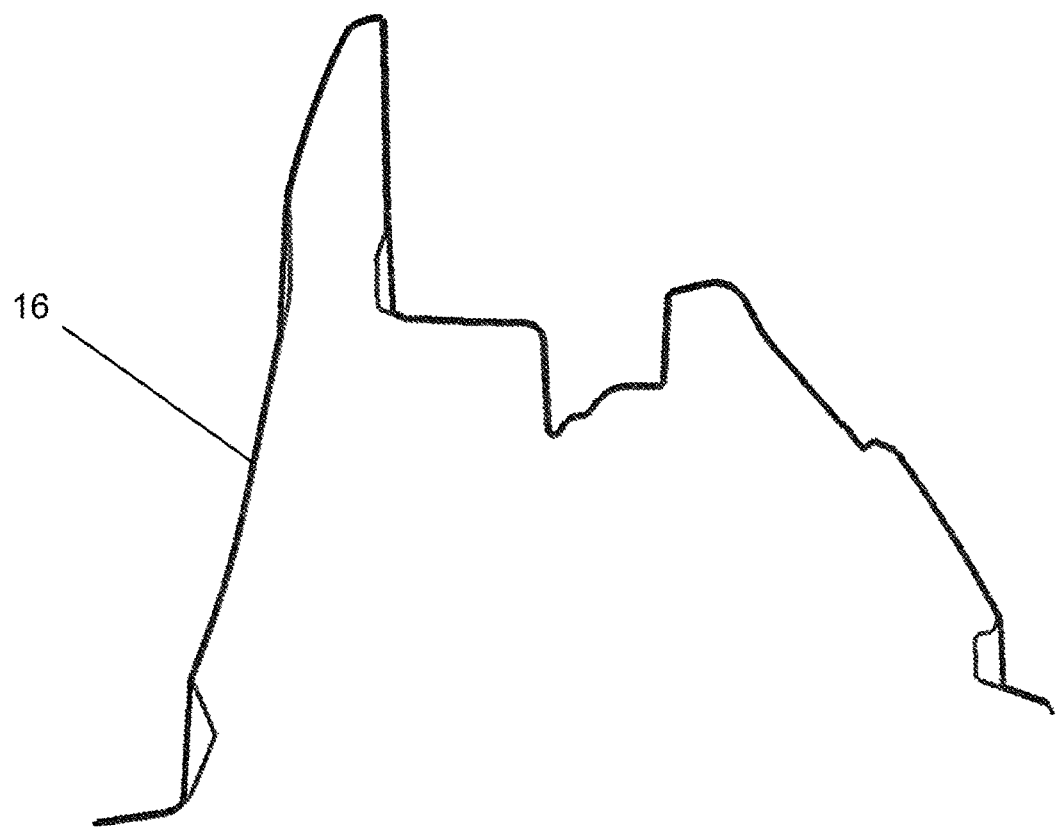
FIG. 5 shows a cast skin produced by a cast skin tool according to the present embodiment.

A tool produced by this method is now able to produce negative skins 16, such as shown, for example, in FIG. 5. These negative skins 16 have thickenings on a surface thereof so as to allow a tool free of undercuts or a tool having fewer undercuts.

LIST OF REFERENCE NUMBERS

11 Galvanoform mold (positive body)
12 base body
13 wax layer
14 tool cavity 15 layer
16 negative skin

The invention claimed is:

1. A method for producing a negative skin, the method comprising acts of:
providing a positive body, wherein a first surface of the positive body forms a positive mold of a negative skin to be produced, wherein the first surface comprises at least one undercut,
applying a wax layer on the first surface of the positive body and filling the at least one undercut with the wax layer,
placing a tool cavity on the positive body,
coating the tool cavity on the applied wax layer with an applied layer,
removing the wax layer to form a cavity for the negative skin, and
producing the negative skin within the cavity, wherein the cavity is formed between the first surface of the positive body and the applied layer.

2. The method according to claim 1, wherein the positive body is held by a base body.

3. The method according to claim 2, wherein the base body is tempered.

4. The method according to claim 1, wherein the tool cavity is tempered.

5. The method according to claim 1, wherein the wax layer has, in areas where no undercuts are filled in, a thickness of 1 mm to 2 mm.

6. The method according to claim 5, wherein the wax layer has, in areas where no undercuts are filled in, a thickness of about 1.5 mm.

7. The method according to claim 1, wherein the layer of the tool cavity has a thickness of 5 mm to 15 mm.

8. The method according to claim 7, wherein the layer of the tool cavity has a thickness of 5 mm to 12 mm.

9. The method according to claim 7, wherein the layer of the tool cavity has a thickness of about 9 mm.

10. The method according to claim 1, wherein the first surface of the positive body is a grained surface, including an etched grain or a laser grain.

11. The method according to claim 1, wherein the negative skin is a silicone skin.

* * * * *